United States Patent
Virani et al.

(10) Patent No.: US 12,346,584 B2
(45) Date of Patent: Jul. 1, 2025

(54) READ OPERATIONS FOR MIXED DATA

(71) Applicant: Micron Technology, Inc., Boise, ID (US)

(72) Inventors: Scheheresade Virani, Frisco, TX (US); Raja V.S. Halaharivi, Gilroy, CA (US); Ning Zhao, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 39 days.

(21) Appl. No.: 17/822,893

(22) Filed: Aug. 29, 2022

(65) Prior Publication Data
US 2024/0069771 A1    Feb. 29, 2024

(51) Int. Cl.
G06F 3/06    (2006.01)

(52) U.S. Cl.
CPC ............ *G06F 3/064* (2013.01); *G06F 3/0604* (2013.01); *G06F 3/0659* (2013.01); *G06F 3/0679* (2013.01)

(58) Field of Classification Search
CPC ...... G06F 3/064; G06F 3/0679; G06F 3/0604; G06F 3/0659
See application file for complete search history.

(56) References Cited

U.S. PATENT DOCUMENTS

| | | | | |
|---|---|---|---|---|
| 6,654,853 | B1* | 11/2003 | Gates | G06F 3/061 710/39 |
| 2004/0158669 | A1* | 8/2004 | Weng | G06F 3/0661 711/111 |
| 2009/0259800 | A1* | 10/2009 | Kilzer | G06F 12/0246 711/E12.008 |
| 2018/0260159 | A1* | 9/2018 | Hall | G11B 20/1217 |
| 2019/0004869 | A1* | 1/2019 | Kim | G06F 12/0246 |
| 2019/0121726 | A1* | 4/2019 | Hsu | G06F 12/0246 |
| 2020/0042725 | A1* | 2/2020 | Bolkhovitin | G06F 21/64 |

* cited by examiner

*Primary Examiner* — Mark A Giardino, Jr.
(74) *Attorney, Agent, or Firm* — Harrity & Harrity, LLP

(57) ABSTRACT

In some implementations, a memory device may receive, from a host device, a read command indicating data and one or more logical block addresses to be read from a memory of the memory device. The memory device may obtain a memory unit from the memory based on the read command. The memory device may determine status information associated with the one or more logical block addresses based on information indicated by the memory unit. The memory device may generate a single data transfer request associated with the one or more logical block addresses, where the single data transfer request indicates status indicators associated with respective logical block addresses of the one or more logical block addresses. The memory device may provide, to the host device, one or more responses to the read command, where the one or more responses are based on the status indicators.

25 Claims, 12 Drawing Sheets

READ OPERATIONS FOR MIXED DATA

TECHNICAL FIELD

The present disclosure generally relates to memory devices, memory device operations, and, for example, to read operations for mixed data.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
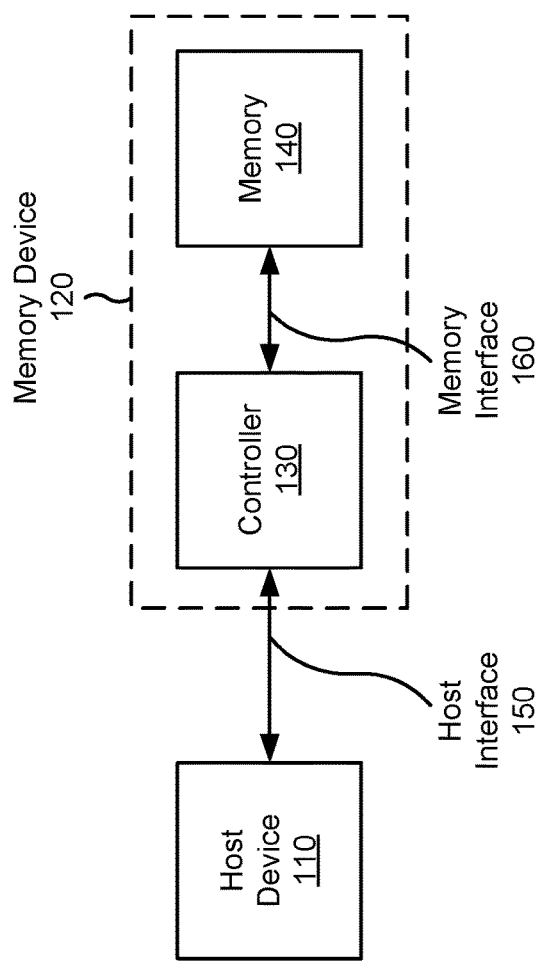
FIG. 1 is a diagram illustrating an example system capable of performing read operations for mixed data.

In some examples, a memory device (e.g., a controller of a memory device) may be associated with hardware components and firmware components. For example, the hardware component(s) may include hardware such as one or more integrated circuits, application-specific integrated circuits (ASICs), discrete components, and/or a buffer memory, among other examples. The hardware component(s) may include digital circuitry with dedicated (i.e., hard-coded) logic to perform the operations described herein. Firmware may be a type of program or software that provides control, monitoring, and data manipulation of the memory device. The firmware component(s) may include one or more instructions, code, and/or software, among other examples, that is configured to the executed by the controller. The firmware component(s) may be configured to control the operations of the controller in operating the memory device.

A host device may use a logical address space to access data stored by a memory device. The logical address space can identify a group of logical units, such as logical blocks. For some types of memory devices (e.g., NAND), a logical block may be the smallest erase unit. For example, a size of data in a logical block may be 512 bytes, 4096 bytes (4 kilobytes (KB)), 8192 bytes (8 KB), or 16384 bytes (16 KB), among other examples, depending on a configuration of the memory device. In some examples, a logical block may be a group of logical pages. A logical page may be an abstraction of physical pages. A memory device may define a logical page to be equal to a particular unit of physical storage (e.g., a physical page, a physical block, etc.). A logical block address (LBA) may be an identifier of a logical block. In some examples, the memory device may manage the logical address space using a translation unit (TU). For some types of memory devices (e.g., NAND memory devices), a TU may be a base granularity of data managed by the memory device. A TU may include a predefined number of logical units (e.g., logical pages and/or logical blocks). In some examples, a TU may be predefined to include one logical block, so that the size of the TU is equal to a size of the logical block. In some other examples, a TU may be predefined to include one logical page, so that the size of the TU is equal to the size of the logical page. In some other examples, a TU is predefined to include multiple logical blocks or multiple logical pages.

The memory device may maintain a memory status of data at a logical block (e.g., at an LBA) level of granularity. For example, each LBA may be associated with an independent memory status. The memory status may indicate a status of data and/or a physical address, associated with an LBA, in memory of the memory device. For example, a memory status may indicate whether data associated with the LBA is valid (e.g., mapped and/or allocated), invalid (e.g., unmapped and/or deallocated), and/or associated with an error or exception case, among other examples. In some examples, a TU may include a set of logical blocks (e.g., associated with respective LBAs). A host device may transmit, to the memory device, a read request (e.g., a read command) associated with multiple logical blocks (e.g., multiple LBAs). The memory device may obtain a TU that is associated with the multiple LBAs. However, in some cases, the TU may include data (e.g., LBAs) that is associated with different memory statuses. A logical unit (e.g., a TU) that is associated with data and/or LBAs that are associated with different memory statuses may be referred to herein as "mixed data."

In such examples, separate data transfer requests may be generated by the memory device for data and/or LBAs having different memory statuses. For example, a read request may be associated with a first LBA associated with a first memory status, a second LBA associated with a second memory status, and a third LBA associated with a third memory status. A firmware component of the memory device may generate a first data transfer request for the first LBA, a second data transfer request for the second LBA, and a third transfer request for the third LBA. In other words, the firmware component may separately process responses to the read request for LBAs that are associated with different memory statuses. Similarly, a hardware component of the memory device may be configured to provide separate responses to the read request based on the separate data transfer requests obtained from the firmware component. Because the firmware may be executed over time (e.g., in one or more processing cycles), this may introduce latency associated with processing the read request. Additionally, executing the firmware to process separate data transfer requests for a single read request that is associated with mixed data consumes processing resources associated with separately processing the data transfer requests.

Some implementations described herein enable read operations for mixed data. For example, the memory device may receive or obtain, from a host device, a read command for reading data associated with one or more logical blocks. The memory device may read, from memory of the memory device, data corresponding to the one or more logical blocks (e.g., may read physical addresses corresponding to a TU). In some implementations, the memory device may be configured to determine a memory status of each logical block read from the memory (e.g., as part of processing the read command). For example, the memory device (e.g., a firmware component) may be configured to analyze metadata associated with the data read from the memory to determine memory statuses of different logical blocks (e.g., for each LBA indicated by the read command).

The memory device may be configured to encode the data corresponding to the one or more logical blocks with one or more respective status indicators based on the determined memory statuses. For example, the one or more respective status indicators may indicate memory statuses associated with the one or more logical blocks. The memory device (e.g., the firmware component) may be configured to provide, to a hardware component of the memory device) a single data transfer request indicating the one or more logical blocks encoded with the one or more respective status indicators. The hardware component may be configured to provide, to the host device, one or more responses to the read command based on the data transfer request. For example, the hardware component may be configured to determine appropriate response(s) to the read command based on the one or more respective status indicators encoded by the firmware component.

As a result, the firmware component may provide a single data transfer request even if a read command is associated with data or LBAs having different memory statuses (e.g., when a read command is associated with mixed data). The hardware component may be configured to determine one or more appropriate responses (e.g., providing the data from the memory, providing a deallocation response, providing an error response, and/or providing another response) based on the status indicators included in the single data transfer request for the different logical blocks (e.g., for the different LBAs). Enabling the memory device to process a read command associated with mixed data via a single data transfer request reduces a processing time associated with processing the read command (e.g., as compared to the firmware component processing the read command via separate or different data transfer requests). Additionally, enabling the memory device to process a read command associated with mixed data via a single data transfer request conserves processing resources associated with processing the read command that would have otherwise been used generating and/or processing multiple data transfer requests for the mixed data.

FIG. 1 is a diagram illustrating an example system 100 capable of performing read operations for mixed data. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to perform read operations for mixed data. For example, the memory device 120 may receive or obtain, from the host device 110, a read command for reading data associated with one or more logical blocks. The memory device 120 may read, from memory of the memory device, data corresponding to the one or more logical blocks (e.g., may read physical addresses corresponding to a TU). In some implementations, the memory device 120 may be configured to determine a memory status of each logical block read from the memory (e.g., as part of processing the read command). For example, the memory device 120 may be configured to analyze metadata associated with the data read from the memory to determine memory statuses of different logical blocks (e.g., for each LBA indicated by the read command). The memory device 120 may be configured to encode the data corresponding to the one or more logical blocks with one or more respective status indicators based on the determined memory statuses. For example, the one or more respective status indicators may indicate memory statuses associated with the one or more logical blocks. The memory device 120 may be configured to provide or generate a single data transfer request indicating the one or more logical blocks encoded with the one or more respective status indicators. The memory device 120 may be configured to provide, to the host device 110, one or more responses to the read command based on the data transfer request. For example, the memory device 120 may be configured to determine appropriate response(s) to the read command based on the one or more respective status indicators encoded for the LBAs.

As indicated above, FIG. 1 is provided as an example. Other examples may differ from what is described with regard to FIG. 1.

Figure 2:
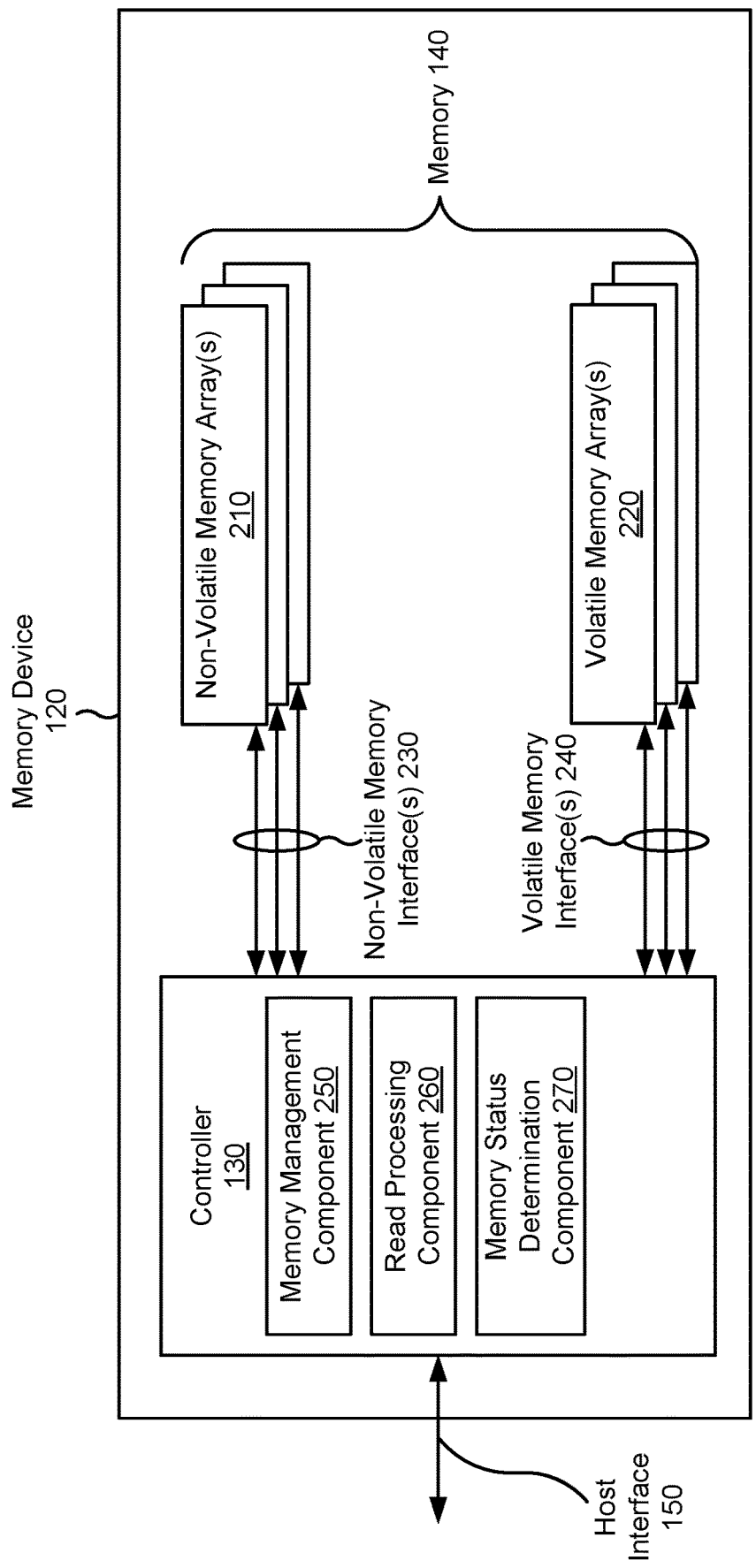
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, a read processing component 260, and/or a memory status determination component 270, among other examples. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The read processing component 260 may be configured to perform one or more operations associated with processing a read request or a read command. For example, the read processing component 260 may be configured to obtain or receive a read command from a host device (e.g., the host device 110). The read processing component 260 may be configured to obtain information associated with a logical unit (e.g., a TU) from a memory location (e.g., where a host read command is associated with one or more logical blocks from a set of logical blocks included in the logical unit). The read processing component 260 may be configured to program or encode status indicators to be associated with the respective logical blocks, from the one or more logical blocks, based on status information (e.g., memory status information) associated with the one or more logical blocks. For example, the read processing component 260 may be configured to encode one or more bits to information associated with the respective logical blocks, where the one or more bits indicate a status indicator from the status indicators. The read processing component 260 may be configured to generate a single data transfer request, associated with the host read command, that indicates the status indicators associated with the respective logical blocks. In some implementations, the read processing component 260 may be configured to provide, to the host device, one or more responses that are based on the status indicators.

The memory status determination component 270 may be configured to identify and/or determine a memory status associated with a given logical block or a given LBA. For example, the memory status determination component 270 may be configured to determine status information associated with respective logical blocks, from the one or more logical blocks, based on information (e.g., metadata) associated with data as stored in memory 140 of the memory device 120. For example, the memory status determination component 270 may be configured to determine one or more status indicators based on metadata associated with respective logical blocks from one or more logical blocks that are indicated by a read command. In some implementations, the memory status determination component 270 may be configured to identify, from the information associated with the logical unit, an indicator that the status information is to be determined by the memory device 120.

Figure 7:
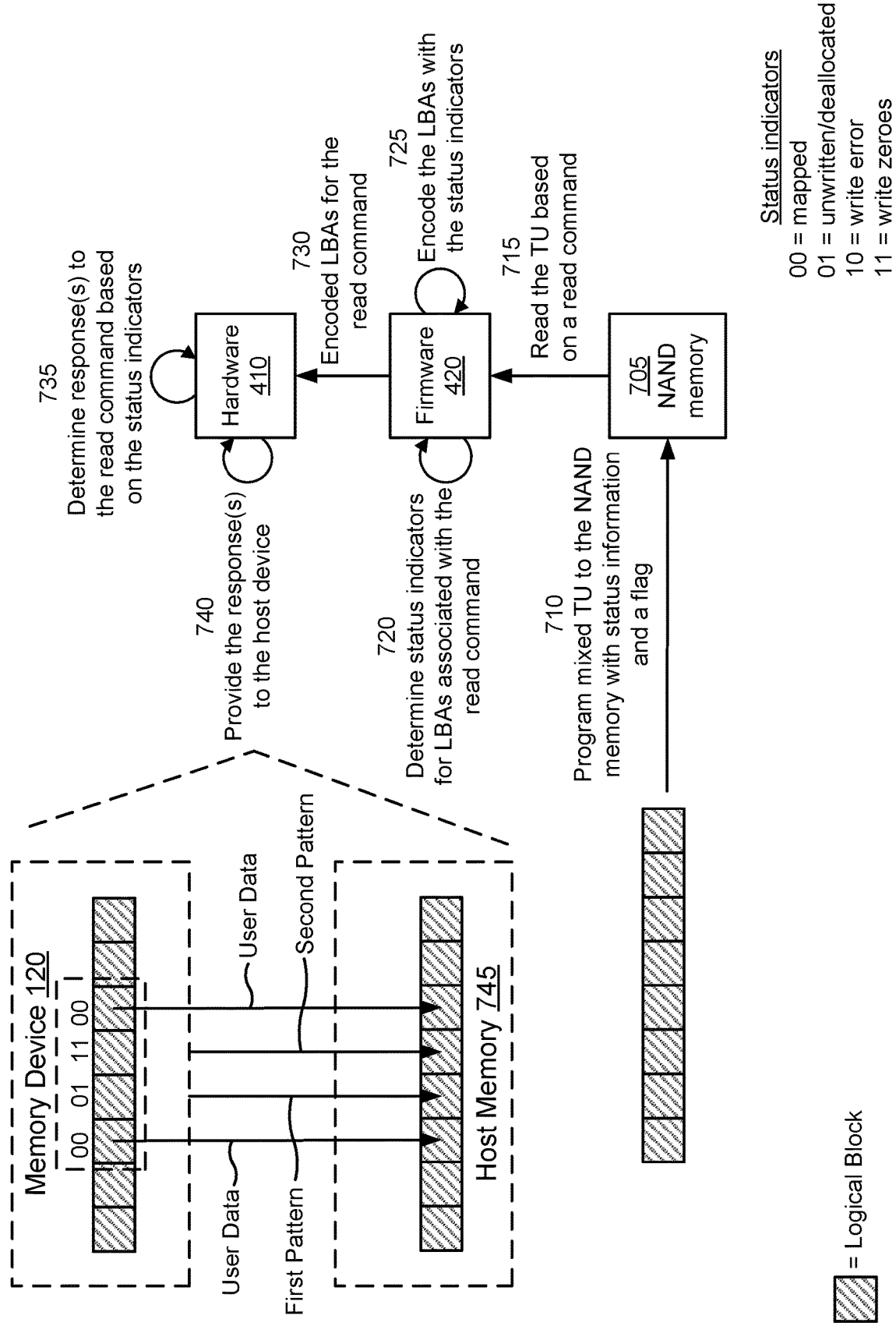
FIG. 7 is a diagram illustrating an example of read operations for mixed data.
Figure 8:
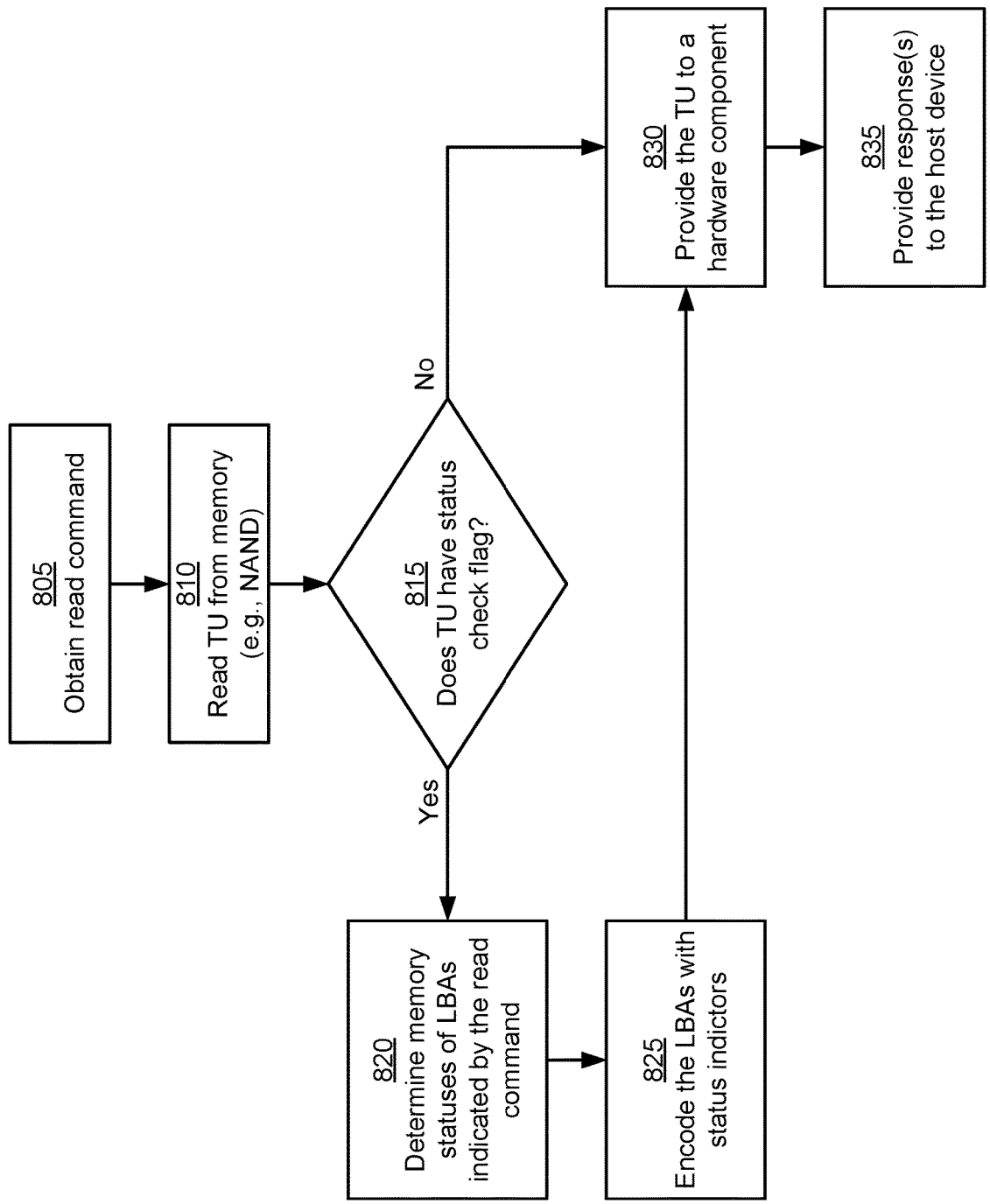
FIG. 8 is a diagram illustrating an example process associated with read operations for mixed data.
Figure 9:
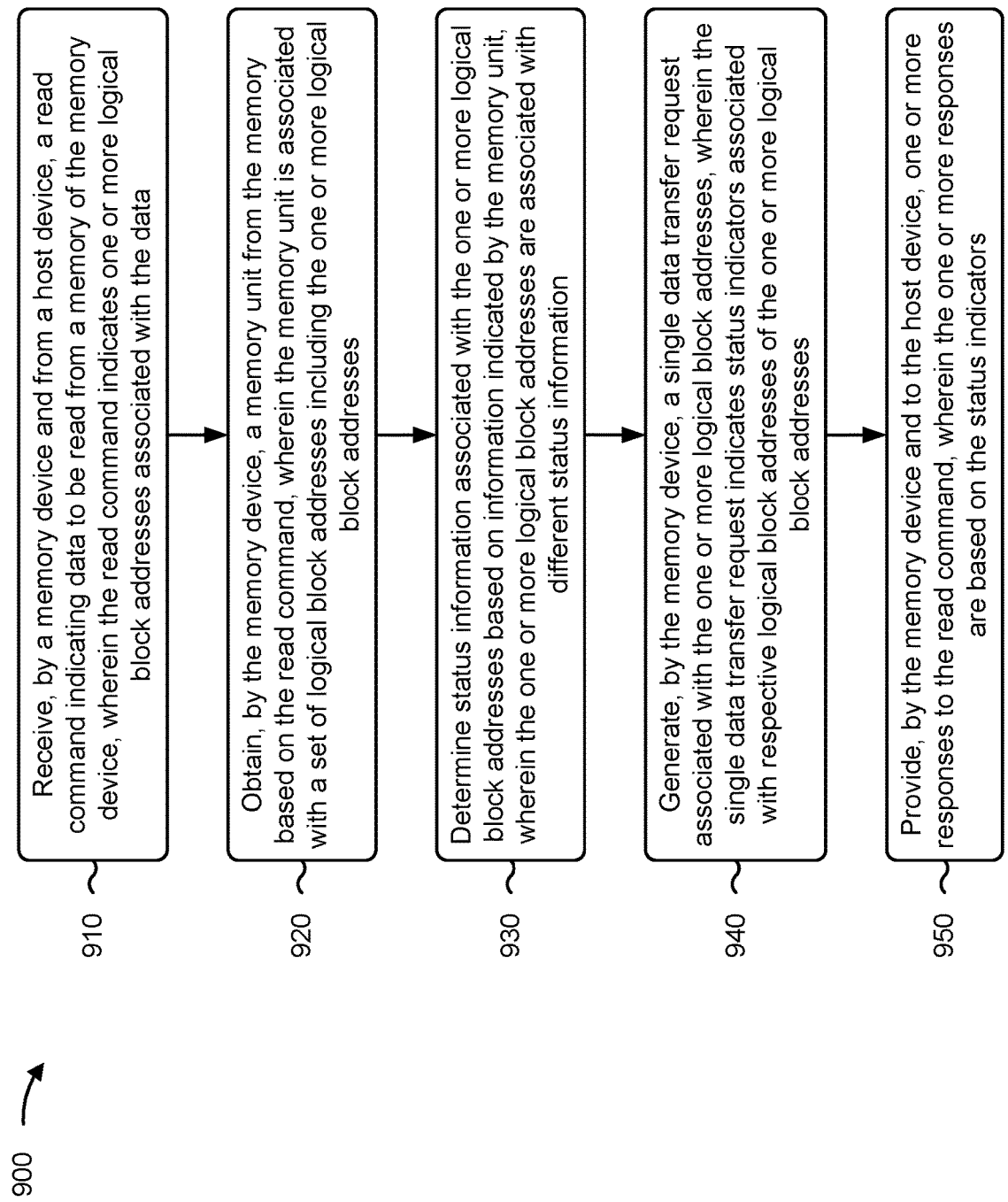
FIG. 9 is a flowchart of an example method associated with read operations for mixed data.
Figure 10:
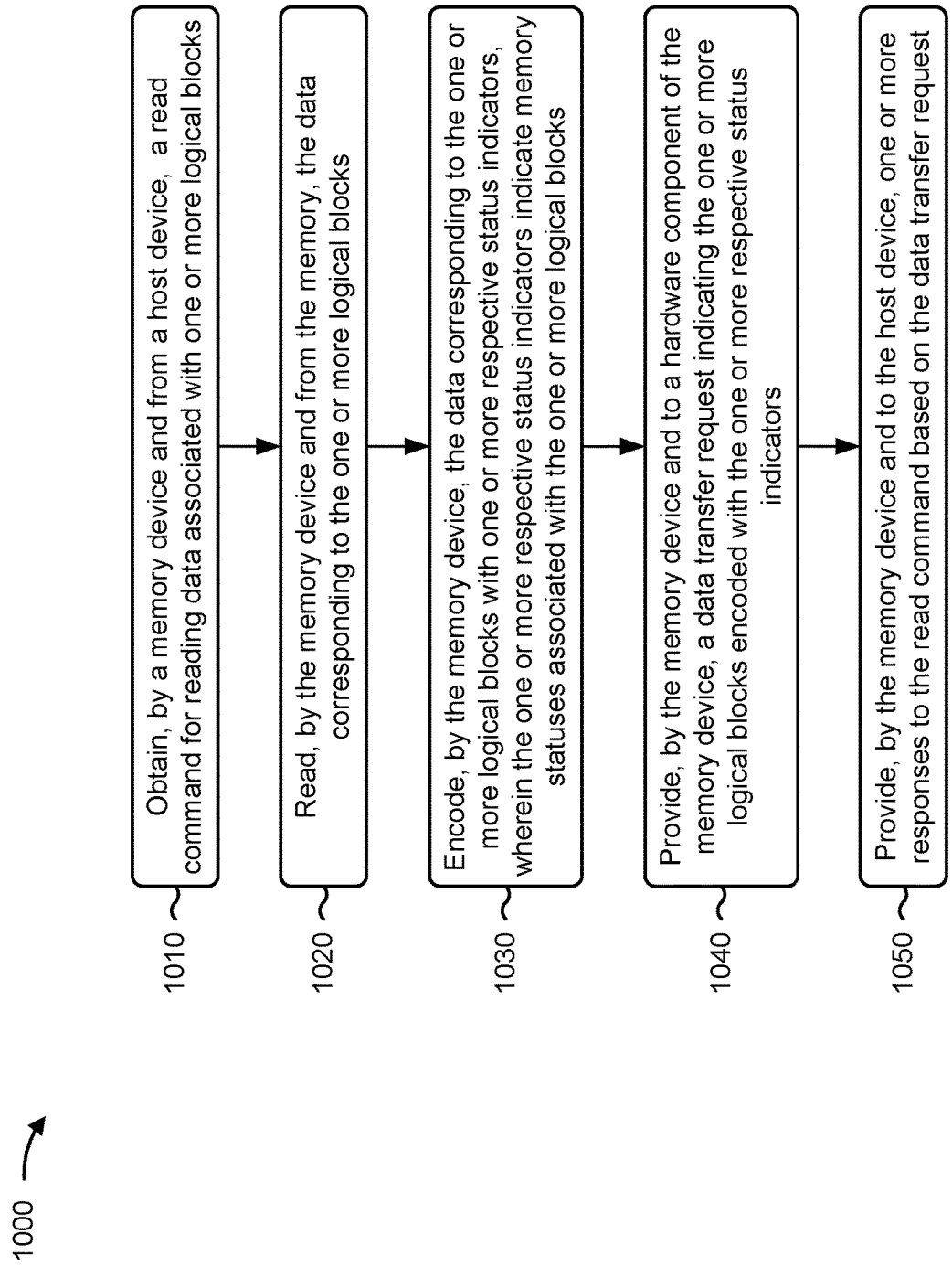
FIG. 10 is a flowchart of an example method associated with read operations for mixed data.
Figure 11:
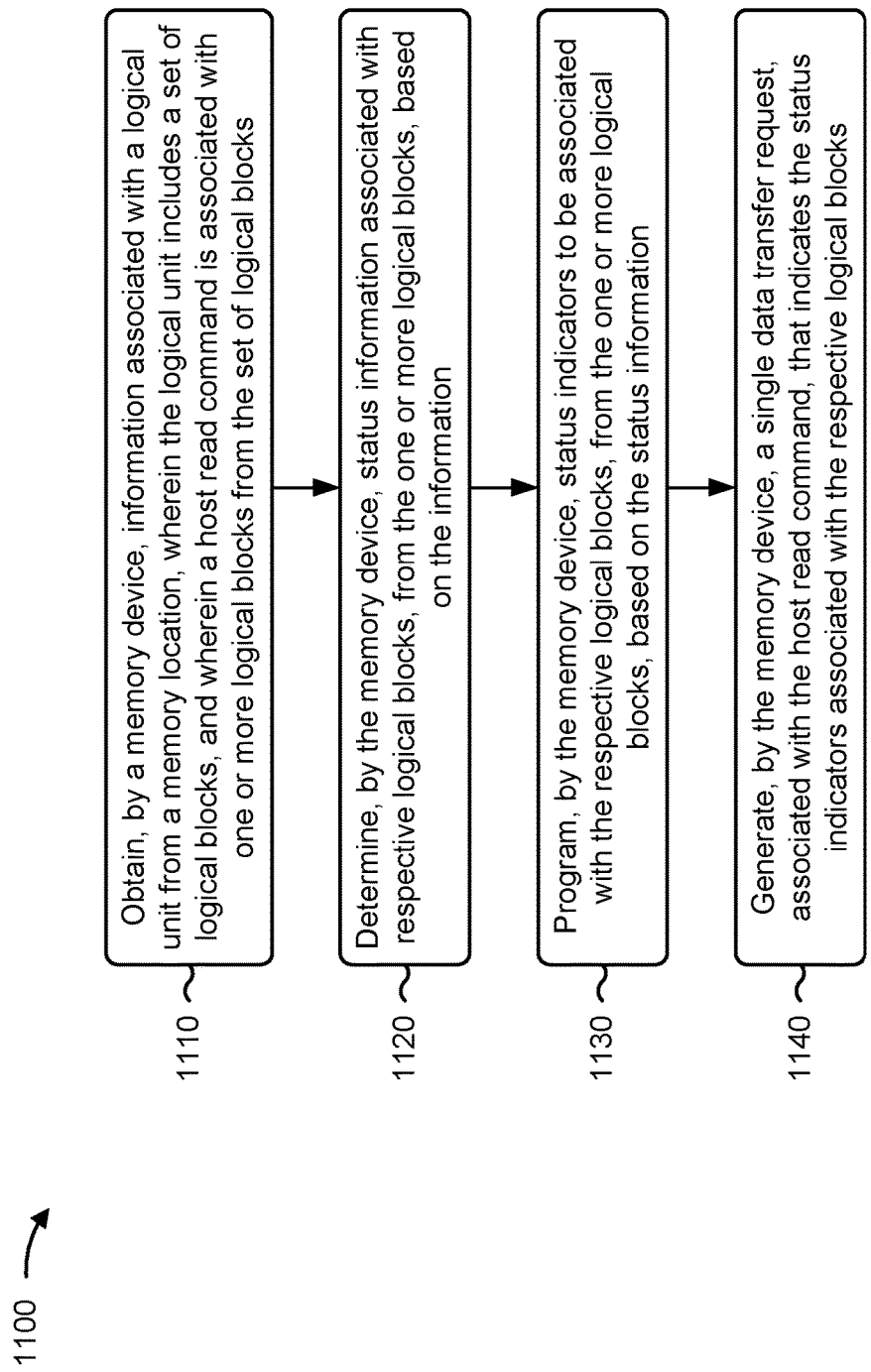
FIG. 11 is a flowchart of an example method associated with read operations for mixed data.

One or more devices or components shown in FIG. 2 may be configured to perform operations described elsewhere herein, such as one or more operations of FIGS. 6A, 6B, 7, and 8 and/or one or more process blocks of the methods of FIGS. 9-11. For example, the controller 130, the memory management component 250, the read processing component 260, and/or the memory status determination component 270 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
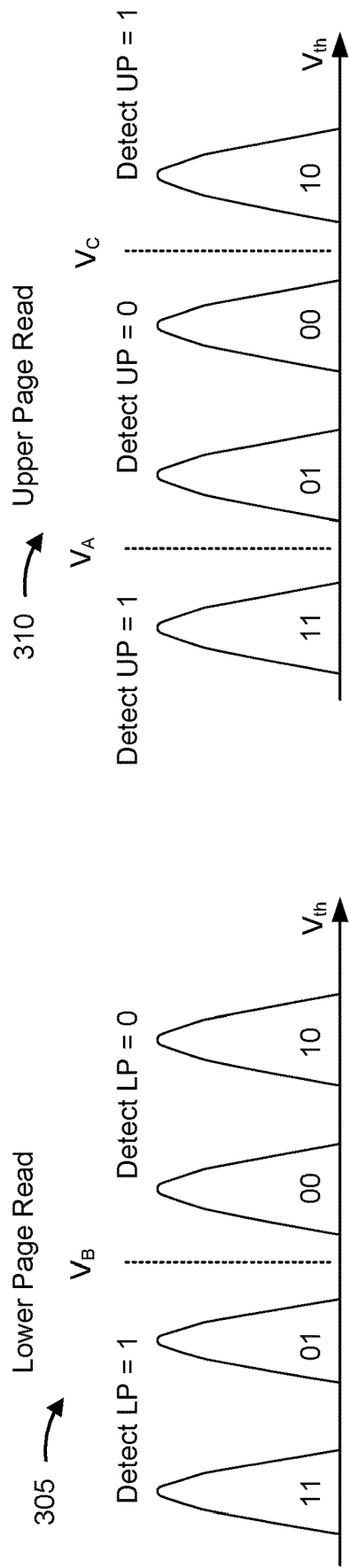
FIG. 3 is a diagram illustrating an example of read operations for an MLC non-volatile memory device.

FIG. 3 is a diagram illustrating an example 300 of read operations for an MLC non-volatile memory device. Although the read operations described in connection with FIG. 3 are described in the context of a multi-level cell (MLC), the described concepts also apply to other types of memory cells, such as single-level cells (SLCs), triple-level cells (TLCs), quad-level cells (QLCs), and other types of memory cells.

Some memory devices may be capable of storing multiple bits per memory cell. For example, an MLC non-volatile memory device (e.g., an MLC flash device) may be capable of storing two bits of information per memory cell in one of four states (e.g., may store binary 11, binary 01, binary 00, or binary 10 depending on a charge applied to the memory cell). To read the data of a memory cell, such as the MLC shown in FIG. 3, the memory device (or a component thereof) may apply a read reference voltage to the cell in an effort to induce current in the memory cell, and the memory device (or a component thereof) may determine a corresponding bit string associated with a voltage that induced (or else did not induce) current. Put another way, the memory device may apply various read reference voltages to sense the threshold voltage (Vth) associated with the data stored in the cell.

More particularly, for an MLC, the memory device may perform a lower page (also shown as LP) read and an upper page (also shown as UP) read. As shown by reference number 305, for a lower page read, the memory device may apply to a read reference voltage, shown as VB. VB may represent a voltage between threshold voltage distributions associated with the first two states (e.g., threshold voltage distributions associated with binary 11 and 01) and threshold voltage distributions associated with the second two states (e.g., threshold voltage distributions associated with binary 00 and 10). If current flows when VB is applied to the memory cell, then the threshold voltage may be considered to be less than VB, thus corresponding to one of binary 11 or binary 01 (meaning that the lower page data represents a "1"). If current does not flow when VB is applied to the memory cell, then the threshold voltage may be considered to be more than VB, thus corresponding to one of binary 00 or binary 10 (meaning that the lower page data represents a "0").

As shown by reference number 310, an upper page read may be performed in a similar manner. More particularly, when the detected lower page data is a "1", a read reference voltage of VA may be applied to the memory cell to thereafter determine the upper page data. VA may represent a voltage between a threshold voltage distribution associated with the first state (e.g., a threshold voltage distribution associated with binary 11) and a threshold voltage distribution associated with the second state (e.g., a threshold voltage distribution associated with binary 01). If current flows when VA is applied to the memory cell, then the threshold voltage may be considered to be less than VA, thus corresponding to binary 11 (meaning that the upper page data represents a "1"). If current does not flow when VA is applied to the memory cell, then the threshold voltage may be considered to be more than VA but less than VB (as determined during the lower page read), thus corresponding to binary 01 (meaning that the upper page data represents a "0").

Similarly, when the detected lower page data is a "0," a read reference voltage of VC may be applied to the memory cell to thereafter determine the upper page data. VC may represent a voltage between a threshold voltage distribution associated with the third state (e.g., a threshold voltage distribution associated with binary 00) and a threshold voltage distribution associated with the fourth state (e.g., a threshold voltage distribution associated with binary 10). If current flows when VC is applied to the memory cell, then the threshold voltage may be considered to be less than VC but more than VB (as determined during the lower page read), thus corresponding to binary 00 (meaning that the upper page data represents a "0"). If current does not flow when VC is applied to the memory cell, then the threshold voltage may be considered to be more than VC, thus corresponding to binary 10 (meaning that the upper page data represents a "1").

As indicated above, FIG. 3 is provided as an example. Other examples may differ from what is described with regard to FIG. 3.

Figure 4:
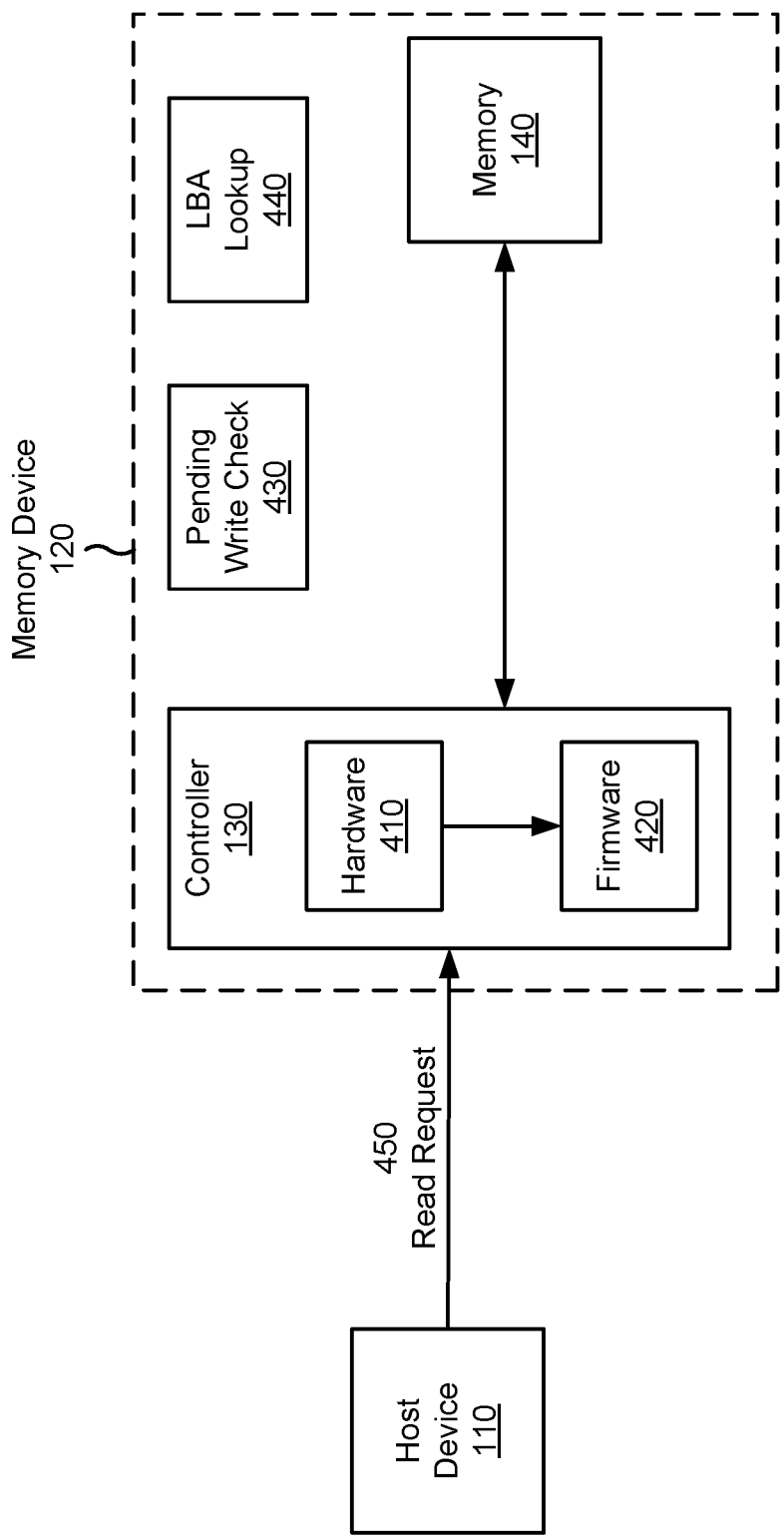
FIG. 4 is a diagram illustrating an example of read operations performed by a controller of a memory device.

FIG. 4 is a diagram illustrating an example 400 of read operations performed by a controller of a memory device. As shown in FIG. 4, the controller 130 (or another component of the memory device 120) may include a hardware component 410 and a firmware component 420. In some implementations, the hardware component 410 may be, may be part of, or may be included, in the host interface 150.

For example, the hardware component 410 may include hardware such as one or more integrated circuits, one or more application-specific integrated circuits (ASICs), discrete components, and/or a buffer memory, among other examples. The hardware component 410 may include digital circuitry with dedicated (i.e., hard-coded) logic to perform the operations described herein. Firmware, in general, may be a type of program or software that provides control, monitoring, and/or data manipulation of the memory device 120. The firmware component 420 may include one or more instructions, code, and/or software, among other examples, that is configured to the executed by the controller 130. The firmware component 420 may be configured to control the operations of the controller 130 in operating the memory device 120, such as the allocation of namespaces or LBA addresses for storing and accessing data in the memory device 120, among other examples.

In some implementations, the hardware component 410 may be configured to perform one or more operations described herein without receiving commands or instructions from the firmware component 420 (e.g., which may be referred to as automated hardware operations). In some implementations, the hardware component 410 may provide a request or command to the firmware component 420 to cause the firmware component 420 to perform one or more operations.

As shown in FIG. 4, a read operation may be associated with a pending write check 430. The pending write check 430 may also be referred to as a coherency check. The coherency check may be associated with a lookup operation to determine whether a piece of data (e.g., a particular TU) is stored in a coherency cache buffer. For example, if a first write command spans a first set of TUs, and a read command is received for a second set of TUs that overlap the first set of TUs, then the overlapping TUs may be stored in the cache buffer to prevent the overlapping TUs from being read from the NAND memory before the overlapping TUs are actually written pursuant to the write command. For example, if a coherency check lookup returns a "hit," then the controller 130 may determine that the piece of data associated with the lookup is stored in the coherency cache buffer. If a coherency check lookup returns a "miss," then the controller 130 may determine that the piece of data associated with the lookup is not stored in the coherency cache buffer.

In some examples, a block of data transferred during media management can be or can be referred to as a TU and can be the smallest size of data internally managed by the memory device 120, by the controller 130, and/or by the host device 110. A TU may correspond to a logical address (e.g., a TU address (TUA) or an LBA address) and a physical address (e.g., an abstracted physical address such as a flash logical address (FLA), which may relate to a physical address of the NAND cell referred to as a platform physical address (PPA)).

Physical memory elements of a storage device can be arranged as logical memory blocks addressed via LBA. A logical memory block may be the smallest LBA addressable memory unit. Each LBA address may identify a single logical memory block that can be mapped to a particular physical address of a memory unit in the memory device 120.

The concept of namespace for a memory device is similar to the concept of partition in a hard disk drive for creating logical storages. Different portions of the memory 140 can be allocated to different namespaces and thus can have LBA addresses configured independently from each other within their respective namespaces. Each namespace identifies a quantity of memory of the memory device 120 addressable via LBA. A same LBA address can be used in different namespaces to identify different memory units in different portions of the memory 140. For example, a first namespace allocated on a first portion of the memory 140 having n memory units can have LBA addresses ranging from 0 to n−1, and a second namespace allocated on a second portion of the memory 140 having m memory units can have LBA addresses ranging from 0 to m−1. An LBA and a namespace identifier may be mapped to a TUA.

The host device 110 may send a request to the memory device 120 for the creation, deletion, or reservation of a namespace. After a portion of the storage capacity of the storage device is allocated to a namespace, an LBA address in the respective namespace logically represents a particular memory unit in the memory 140, although the particular memory unit logically represented by the LBA address in the namespace may physically correspond to different memory units at different time instances (e.g., as in SSDs). For example, a read command or a write command may indicate an LBA address and a namespace identifier associated with a unit of data. LBA translation may include translating the LBA address and the namespace identifier into a TU address. The TU address may be translated (e.g., via a logical-to-physical (L2P) mapping table) into a physical address (e.g., an FLA) associated with a location of the unit of data in the memory 140 (e.g., the physical address may point to a die, plane, block, and/or page associated with the unit of data in the memory 140).

For example, in order to maintain the flow of commands, the memory device 120 may employ two tables that point to write data, which are implemented and maintained by the controller 130. A first table may be referred to as an L2P mapping table. The L2P mapping table may also be referred to as an LBA table or an LBA translation table. Each entry of the L2P mapping table maps an LBA address to a corresponding physical address of the data block on the memory device 120. The L2P mapping table may contain references or pointers to data that is physically stored in the memory device 120. When the L2P mapping table is updated based on a write command, the corresponding L2P entry will point to actual data stored in the memory device 120. By contrast, when the L2P mapping table is updated based on a deallocate command, the L2P mapping table will not point to data stored on a memory device, but instead will contain a deallocate-specific marker which results in zeros (and/or an error message) being sent back to the host device 110 in response to a subsequent read command.

The second table may be referred to as a "coherency table," which maintains information regarding outstanding write data that is temporarily cached in a volatile memory of the memory device 120. Upon updating the L2P mapping table and writing data to the memory 140 (e.g., to NAND memory), the corresponding write data can be evicted from the cache and cleared from the coherency table. Deallocate commands do not have actual data content, and instead only include LBA ranges to be deallocated. Because no data is actually transferred from the host device 110 with deallocate commands, there is no data to store in the cache memory, and the coherency table is not updated. Instead, the deallocate command bypasses the coherency table operation and the L2P mapping table is updated with the deallocate-specific marker indicating that there is no data to be written to the memory device 120.

As shown in FIG. 4, and by reference number 450, the memory device 120 may receive a read request command from the host device 110. For example, the read request command may be a request to read a particular piece of data. The hardware component 410 may be configured to perform one or more operations based on receiving the read request command (e.g., automatically without processing by firmware component 420). In other words, the hardware component 410 may be configured to perform one or more operations without the controller 130 executing software and/or instructions (e.g., the firmware component 420). The read command may indicate an LBA address and/or a namespace identifier associated with the data to be read. The memory device 120 (e.g., via the controller 130, the hardware component 410 and/or the firmware component 420) may perform one or more operations to process the read request command, such as performing one or more lookup operations (e.g., a pending write check 430 and/or an LBA lookup 440).

As indicated above, FIG. 4 is provided as an example. Other examples may differ from what is described with regard to FIG. 4.

Figure 5:
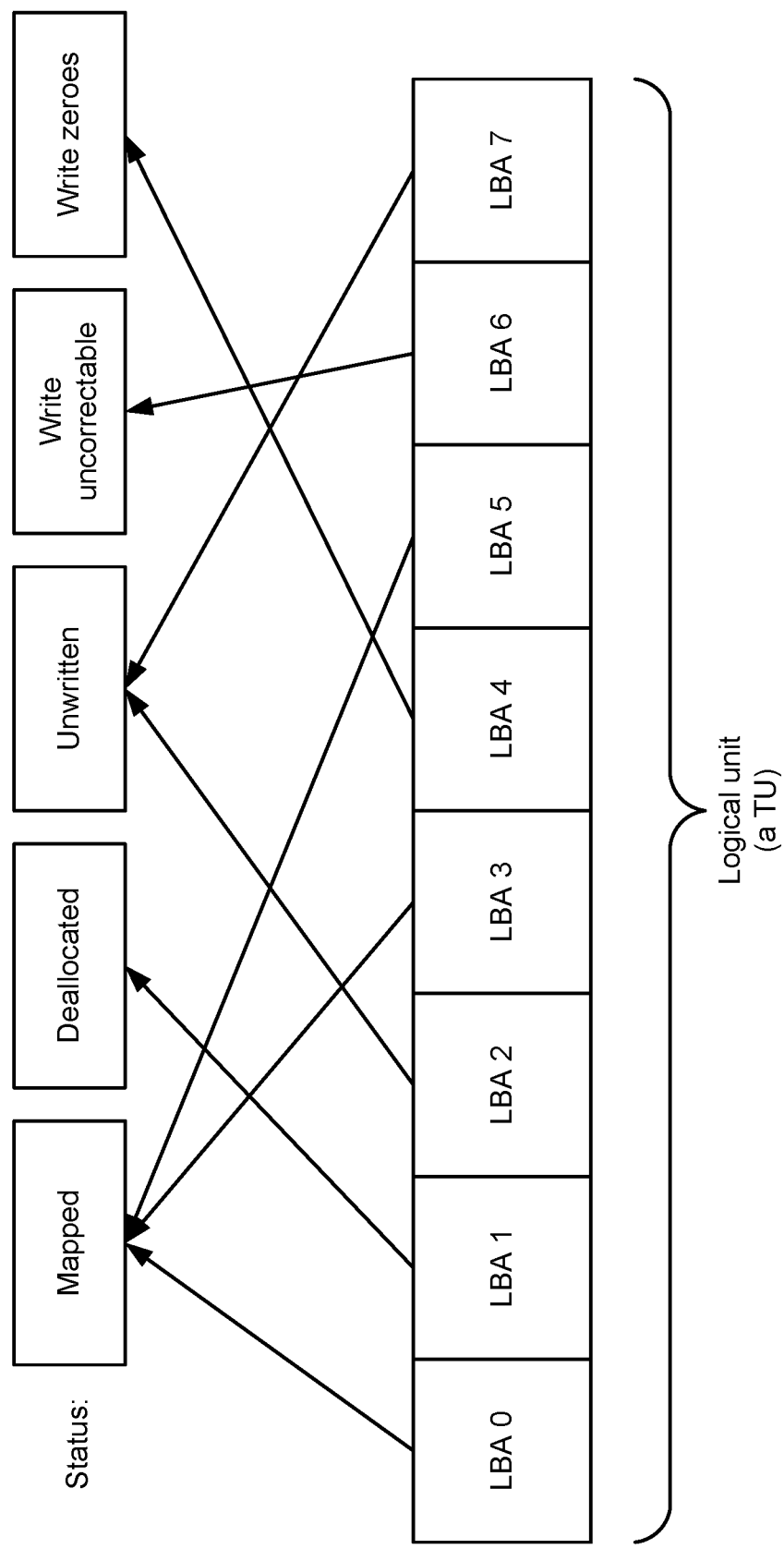
FIG. 5 is a diagram illustrating an example of a mixed logical unit.

FIG. 5 is a diagram illustrating an example of a mixed logical unit. For example, the logical unit may be a TU. As shown in FIG. 5, the TU may be associated with a set of LBAs (e.g., with a set of logical blocks). As described elsewhere herein, the logical unit (e.g., the TU) may be a base granularity of data managed by the memory device 120 (e.g., the memory device 120 may read and/or write data in units of TUs). In some examples, a host device (e.g., the host device 110) may request access to (e.g., read) data in a finer granularity than a TU. For example, the host device 110 may request to read data associated with one or more LBAs.

Although the TU may be the base granularity of data managed by the memory device 120, each logical block (e.g., each LBA) may be associated with a memory status. In other words, a given TU may include logical blocks (e.g., LBAs) that are associated with different memory statuses (e.g., as shown in FIG. 5). The memory status may indicate a status associated with data and/or a physical address that is associated with, or mapped to, a given logical block or a given LBA. For example, a memory status may include a mapped status. The mapped status may indicate that the logical block or the LBA is mapped to a physical address (e.g., in an L2P table) and that data is stored at the physical address in the memory 140. As another example, a memory status may include a deallocated status. The deallocated status may indicate that data associated with the logical block or the LBA has been deallocated (e.g., by the memory device 120 and/or by the host device 110). For example, a "trim" operation, an "unmap" operation, and/or a "deallocate" operation may enable the host device 110 to inform the memory device 120 which portions of memory can be erased because they are no longer in use. A physical address and/or data may be "deallocated" after the memory device 120 receives an indication that the memory is no longer in use and prior to the memory device 120 erasing the data.

As another example, a memory status may include an unwritten status. The unwritten status may indicate that no data is written to a physical address in the memory 140 that is associated with, or mapped to, the logical block or the LBA. As another example, a memory status may include a write uncorrectable status or an error status. For example, the write uncorrectable status may indicate that a physical address and/or data associated with the logical block or the LBA is associated with an uncorrectable error correction code (ECC) or another error code. As another example, a memory status may include a write zeroes status. The write zeroes status may indicate that the logical block or the LBA is associated with an all-zeros write operation initiated by the host device 110 (e.g., indicating that a response to the read command indicating bits that are all associated with a value of zero is to be provided). The memory statuses described above are provided as examples, and a logical block or an LBA may be associated with other memory statuses.

Different responses may be provided to the host device 110 depending on a memory status associated with a logical block and/or an LBA. For example, for the mapped status, the response may include the data that is stored at the physical address (e.g., in the memory 140) that is mapped to the logical block and/or the LBA. If the memory status is the deallocated status, the response may include a deallocation response (e.g., an all-zeroes response, a pattern of data, and/or random data). If the memory status is the unwritten status, then the response may include an error message and/or another response (e.g., an all-zeroes response, a pattern of data, and/or random data). If the memory status is the write uncorrectable status, then the response may include an error message. If the memory status is the write zeroes status, then the response may include bits that are all associated with a value of zero. Therefore, in some cases, logical blocks and/or LBAs (e.g., in the same TU) associated with different memory statuses may be handled separately by the memory device 120 to ensure that the appropriate response is provided to the host device 110. However, as described above, this may increase processing time and/or consume processing resources associated with processing the read command.

As indicated above, FIG. 5 is provided as an example. Other examples may differ from what is described with regard to FIG. 5.

Figure 6A:
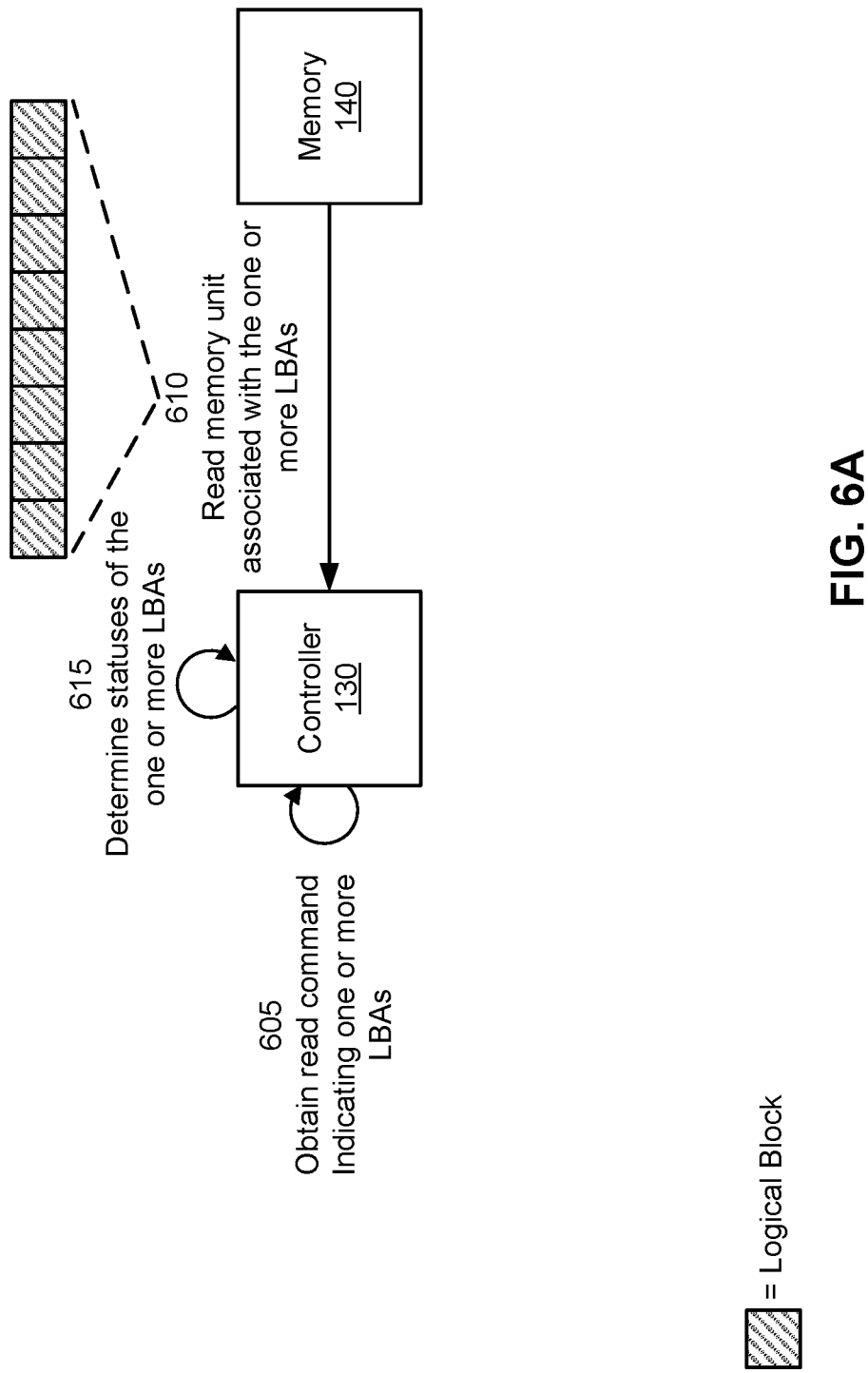
FIGS. 6A and 6B are diagrams illustrating an example of read operations for mixed data.
Figure 6B:
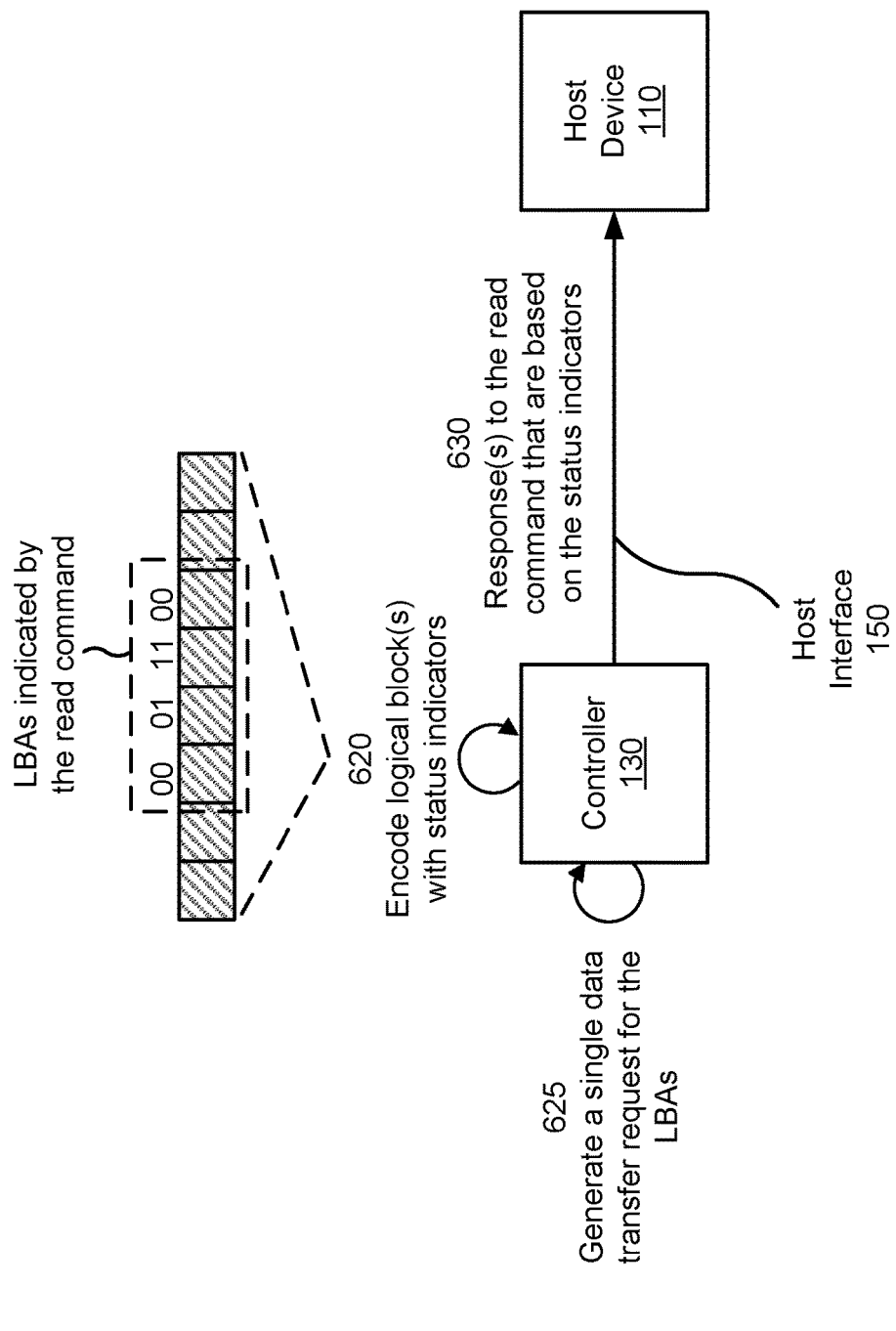

FIGS. 6A and 6B are diagrams illustrating an example of read operations for mixed data. For example, the memory device 120 may receive a read command from the host device 110 (e.g., indicating data to be read from the memory 140 of the memory device 120). The read command may be associated with reading data and/or LBAs that are associated with different statuses (e.g., mixed data). For example, the read command may indicate one or more LBAs associated with the data to be read from the memory 140.

As shown in FIG. 6A, and by reference number 605, the controller 130 may be configured to obtain a read command for reading data associated with one or more logical blocks (e.g., one or more LBAs). In some implementations, the read command may indicate one or more LBAs and/or one or more namespace identifiers. The controller 130 may determine one or more TUAs associated with the read command based on the one or more LBAs and/or one or more namespace identifiers (e.g., an LBA and namespace identifier may be mapped to a TUA). The controller 130 may be configured to determine a physical address associated with the TUA via an L2P table stored by the controller 130.

As shown by reference number 610, the controller 130 may be configured to read, from the memory 140, a memory unit (e.g., a TU) associated with the one or more LBAs indicated by the read command. For example, the controller 130 may be configured to cause a read operation (e.g., similar to the operation(s) described above in connection with FIG. 3) to be performed for the physical address(es) mapped to the TUA(s) that are associated with the read command. For example, the controller 130 may be configured to obtain the memory unit from the memory 140 based on receiving or obtaining the read command.

As shown in FIG. 6A, the memory unit (e.g., the TU) may be associated with a set of logical block addresses including the one or more logical block addresses indicated by the read command. In other words, the controller 130 may be configured to read a translation unit that includes a set of logical blocks including the one or more logical blocks indicated by the read command. For example, because the TU (e.g., the memory unit) may be a smallest unit of data managed by the controller 130, the controller 130 may obtain an entire TU that includes one or more logical blocks (e.g., LBAs) that are indicated by the read command.

As shown by reference number 615, the controller 130 may be configured to determine statuses (e.g., memory statuses) of the one or more LBAs (e.g., included in the TU) that are associated with the read command. For example, the controller 130, after reading the TU from the memory 140, may be configured to determine the memory statuses associated with the one or more LBAs indicated by the read command. In some implementations, the TU may include an indication (e.g., a flag or one or more bits) indicating that the memory statuses of the set of logical blocks included in the TU are to be checked by the memory device 120 prior to data associated with the set of logical blocks being provided to the host device 110.

In other words, when the memory device 120 and/or controller 130 write or program the TU in the memory 140, the controller 130 may be configured to include a flag indicating that the controller 130 (e.g., a firmware component of the controller 130) is to check the memory statuses of LBAs associated with the TU as part of a read operation prior to passing the TU to a hardware component of the memory device 120 for completing the read command. For example, the controller 130 may be configured to include the flag (or other indicator) as metadata associated with the TU. In some implementations, the controller 130 may be configured to set the flag (or other indicator) when causing the TU to be stored in the memory 140 to a value to cause the controller 130 to check the memory statuses of LBAs associated with the TU. In some implementations, the controller 130 may be configured to set the flag (or other indicator) to the value based on LBAs or logical blocks associated with the TU being associated with different memory statuses. For example, the TU read from the memory 140 may include an indication that memory statuses of the set of logical blocks associated with the TU are to be checked by the memory device 120 (e.g., by firmware of the memory device 120) prior to data associated with the set of logical blocks being provided to the host device 110. In other words, the controller 130 may be configured to identify an indicator (e.g., the flag) that the status information is to be determined by the memory device 120 and/or the controller 130 as part of a read operation associated with the TU. The controller 130 may be configured to determine the status information of the LBAs (e.g., as described herein) based on identifying the indicator when reading the TU from the memory 140. For example, if LBAs or logical blocks associated with the TU are associated with the same memory status, then the controller 130 may not determine or check the memory statuses of the LBAs as described herein.

As described above, the statuses (e.g., the memory statuses) may include a mapped status, an unwritten status, a deallocated status, an error status, and/or a write-zeroes status, among other examples. The memory statuses are described in more detail in connection with FIG. 5. For example, the controller 130 may be configured to obtain information associated with the TU (e.g., a logical unit) from a memory location (e.g., a physical address) in the memory 140. The information may be metadata that is stored (e.g., in the memory 140) in connection with user data that is associated with the TU. For example, when the TU is written to, or programmed to, the memory 140, data that is stored in connection with the TU may include user data and metadata.

The controller 130 may be configured to determine status information associated with respective logical blocks, from the one or more logical blocks indicated by the read command, based on the information (e.g., based on the metadata). For example, the metadata may include an indication of a memory status associated with an LBA or a logical block. For example, the metadata may include one or more bits or other information that indicates the statuses (e.g., the memory statuses) of logical blocks that are associated with the TU. The controller 130 may be configured to check (e.g., determine or identify) the memory status of LBAs indicated by the read command based on the metadata (e.g., associated with the TU) that is read from the memory 140.

In some implementations, the controller 130 may be configured to determine a status indicator that is to be associated with a logical block or an LBA based on the memory status of the logical block or the LBA. For example, the controller 130 may be configured to determine, for the one or more logical blocks indicated by the read command, one or more respective status indicators based on the metadata associated with respective logical blocks from the one or more logical blocks. For example, a status indicator may include information (e.g., one or more bits) that indicate a memory status. The controller 130 may be configured to determine, for each logical block or LBA indicated by the read command, a status indicator to be associated with the logical block or the LBA.

In some implementations, the controller 130 may be configured to store the TU (e.g., the memory unit) that is read from the memory 140 in a temporary storage location (e.g., a buffer or a cache) based on obtaining the TU from the memory 140. For example, based on reading the TU from the memory 140, the controller 130 may be configured to store the TU in a buffer while the read command is processed by the controller 130. The temporary storage location (e.g., the buffer or the cache) may include a DRAM storage location or an SRAM storage location, among other examples.

As shown in FIG. 6B, the controller 130 may be configured to process the TU (e.g., that is associated with mixed data) using a single data transfer request. For example, as shown by reference number 620, the controller 130 may be configured to encode the logical blocks(s) indicated by the read command with respective status indicators. For example, the controller 130 may be configured to encode the data corresponding to the one or more logical blocks with one or more respective status indicators. The one or more respective status indicators may indicate memory statuses associated with the one or more logical blocks. In some implementations, the controller 130 may encode memory slots of the buffer (e.g., in which the TU is stored) with the status indicators.

For example, the controller 130 may encode one or more bits to information associated with the respective logical blocks. The one or more bits may indicate a status indicator. For example, the controller 130 may store a mapping of bit(s) to a status indicator. As an example, bit values of "00" may map to a mapped status, bit values of "01" may map to an unmapped status and/or a deallocated status, bit values of "10" may map to a write error status, and/or bit values of "11" may map to a write zeroes status, among other examples. The controller 130 may determine a status indicator (e.g., a value of one or more bits) to be encoded to a given logical block or a given LBA based on the memory status associated with the given logical block or the given LBA (e.g., determined by the controller 130 as described elsewhere herein, such as in connection with FIG. 6A).

For example, as shown in FIG. 6B, the controller 130 may encode LBA(s) that are indicated by the read command with bit(s) that indicate the status indicators (e.g., the memory statuses) of the LBA(s). As shown in FIG. 6B, the read command may indicate four LBAs from a given TU. The controller 130 may be configured to encode the four LBAs with respective status indicators (e.g., bit values of "00," "01," "11," and "00," respectively). In some implementations, the controller 130 may be configured to program the LBAs or a storage location within a buffer with the status indicators.

In some implementations, a status indicator, from the one or more respective status indicators, may indicate data and protection information to be provided to the host device 110 for a logical block, from the one or more logical blocks, that is associated with the status indicator. For example, for memory statuses other than the mapped status, a response to the read command may not include data stored in the memory 140. For example, a response to a read command for an LBA that is associated with a memory status other than the mapped status may include a pre-defined or pre-configured pattern of data (e.g., all zeroes, random data, or another pattern of data) and protection information. The protection information may include a deallocated data pattern, a guard pattern, a system tag (SYSTAG) (e.g., a SYSTAG identifier), an application identifier, and/or a reference identifier, among other examples. A status indicator (e.g., values of bits) may map to one or more data patterns and/or protection information that is to be provided to the host device 110 as a response to the read command.

For example, the controller 130 may store a table that maps status indicators to data (e.g., pre-defined or pre-configured patterns of data) and protection information to be provided to the host device 110 as a response to a read command. The controller 130 (e.g., a hardware component of the controller 130) may be configured to perform a lookup operation in the table based on the status indicator associated with an LBA to determine an appropriate response to be provided to the host device 110 for the LBA.

As shown by reference number 625, the controller 130 may be configured to generate a single data transfer request associated with the one or more logical block addresses. A data transfer request may be a request for one or more components of the memory device 120 to provide data or another response to the host device 110 (e.g., via the host interface 150). The single data transfer request may indicate status indicators associated with respective LBAs of the one or more LBAs indicated by the read command. For example, if a read command requests access to data or LBAs that are associated with different statuses (e.g., mixed data), the controller 130 may be configured to generate a single data transfer request for the mixed data by including the status indicators encoded with the LBAs in the single data transfer request. This may reduce a processing time and/or conserve processing resources that would have otherwise been associated with generating and/or providing separate data transfer requests for LBAs that are associated with different statuses (e.g., different memory statuses).

In some implementations, the single data transfer request may indicate a status indicator for each logical block address indicated by the read command. For example, each LBA may be encoded with a status indicator. In some other examples, two or more LBAs may be associated with a single status indicator (e.g., to reduce a size associated with the data transfer request). For example, in some cases, two or more LBAs, from the LBAs indicated by the read command, may be sequential or consecutive in an order of the LBAs (e.g., ordered by index values of the LBAs) and may be associated with the same status information (e.g., the same memory status). In such examples, the data transfer request may indicate a single status indicator for the two or more LBAs. For example, a first LBA (e.g., of the two or more LBAs) may be encoded with a status indicator. If a next LBA (e.g., in the order of the LBAs as indicated by the index values) is not encoded with a status indicator, then it may be assumed (e.g., by the controller 130 or another component of the memory device 120) that the next LBA is associated with the same status indicator as the first LBA.

In some implementations, the controller 130 (e.g., a firmware component of the controller 130) may be configured to provide, to a hardware component of memory device 120 (e.g., of the controller 130 and/or of the host interface 150), the data transfer request indicating the one or more logical blocks encoded with the one or more respective status indicators. For example, the single data transfer request may be generated via one or more firmware components (e.g., the firmware component 420) of the memory device 120. Providing the single data transfer request may cause the one or more hardware components to provide one or more responses to the host device 110. In other words, the status indicators encoded to the LBAs may facilitate a hardware component to automatically provide appropriate responses to the host device 110 (e.g., without receiving separate data transfer requests and/or without receiving separate instructions from a firmware component of the memory device 120). Therefore, the status indicators (e.g., that indicate memory statuses of the LBAs indicated by the read command) may enable one or more hardware components of the memory device 120 to perform actions (e.g., automated actions) to provide one or more responses to the host device 110 (e.g., responsive to the read command).

In some implementations, the controller 130 (e.g., the firmware component of the controller 130) may be configured to pass a buffer in which the TU is stored. For example, memory slots corresponding to the LBAs indicated by the read command may be encoded with status indicators. Therefore, a hardware component of the memory device 120 may be configured to obtain the buffer and identify the status indicators of the LBAs indicated by the read command. The controller 130 (and/or the hardware component) may be configured to determine an appropriate response to be provided to the host device for each LBA based on the status indicators encoded with each LBA.

For example, as shown by reference number 630, the memory device 120 (e.g., the controller 130 and/or one or more components of the memory device 120) may be configured to provide, to the host device 110, one or more responses to the read command. As described elsewhere herein, the one or more responses may be based on the status indicators encoded with LBAs indicated by the read command. For example, a status indicator, from the status indicators, may be mapped to one or more possible responses to be provided to a host device 110 in response to the host read command. For example, the one or more responses may include user data, a fixed pattern, an error response, and/or a deallocation response, among other examples.

For example, the memory device 120 (e.g., the hardware component and/or a component of the host interface 150) may be configured to identify a status indicator, from the one or more respective status indicators, associated with a logical block, from the one or more logical blocks (e.g., as indicated by the single data transfer request). The memory device 120 (e.g., the hardware component and/or a component of the host interface 150) may be configured to provide, to the host device 110, user data associated with the logical block or a response pattern based on the status indicator.

For example, if the status indicator is mapped to a mapped status (e.g., a mapped memory status), then a response for the LBA encoded with the status indicator may include providing user data (e.g., that is read from the memory 140) associated with the LBA to the host device 110. As another example, if the status indicator is mapped to an unwritten status or a deallocated status, then a response for the LBA encoded with the status indicator may include providing a pre-configured pattern of data (e.g., all zeroes, random data, or another pattern of data). As another example, if the status indicator is mapped to an error status or a write uncorrectable status, then a response for the LBA encoded with the status indicator may include providing an error message.

For example, status indicators associated with logical blocks indicated by the read command may indicate a first memory status associated with a first logical block and a second memory status associated with a second logical block, of the one or more logical blocks. The memory device 120 (e.g., the hardware component and/or a component of the host interface 150) may be configured to determine a first response for the first logical block (e.g., based on a first status indicator mapped to the first memory status) and may determine a second response for the second logical block (e.g., based on a second status indicator mapped to the second memory status). For example, the first memory status and the second memory status may both be indicated in the data transfer request (e.g., via the first status indicator being encoded to the first logical block and the second status indicator being encoded to the second logical block). The memory device 120 (e.g., the hardware component and/or a component of the host interface 150) may be configured to provide, to the host device 110, the first response associated with the first logical block and based on the first memory status. Additionally, the memory device 120 (e.g., the hardware component and/or a component of the host interface 150) may be configured to provide, to the host device 110, the second response associated with the second logical block and based on the second memory status.

In other words, the one or more responses to the host device 110 may include a first type of response (e.g., user data) and a second type of response (e.g., a pre-configured pattern of data, an error message, and/or a deallocation response). The controller 130 generating and/or providing the single data transfer request may cause the first type of response and the second type of response to be provided to the host device 110 in response to the read command. In other examples, if the data transfer request indicates that all LBAs associated with the read command are associated with the same memory status (e.g., if all LBAs are encoded with the same status indicator), the memory device 120 (e.g., the hardware component and/or a component of the host interface 150) may be configured to provide a single response (and/or the same type of response) to the host device 110 in response to the read command.

In some implementations, the memory device 120 may be configured to erase the buffer (e.g., that is storing the TU that is read from the memory 140 based on receiving the read command) based on providing the one or more responses to the host device 110. For example, a hardware component and/or the host interface 150 may be configured to deallocate the buffer based on receiving the data transfer request and/or based on providing the one or more responses to the host device 110.

As a result, a firmware component of the memory device 120 may provide a single data transfer request even if a read command from the host device 110 is associated with data or LBAs having different memory statuses (e.g., when a read command is associated with mixed data). A hardware component and/or the host interface 150 may be configured to determine one or more appropriate responses (e.g., providing the data from the memory, providing a deallocation response, providing an error response, and/or providing another response) based on the status indicators included in the single data transfer request for the different logical blocks (e.g., for the different LBAs). Enabling the memory device 120 to process a read command associated with mixed data via a single data transfer request reduces a processing time associated with processing the read command (e.g., as compared to the firmware component processing the read command via separate or different data transfer requests). Additionally, enabling the memory device 120 to process a read command associated with mixed data via a single data transfer request conserves processing resources associated with processing the read command that would have otherwise been used generating and/or processing multiple data transfer requests for the mixed data.

As indicated above, FIGS. 6A and 6B are provided as examples. Other examples may differ from what is described with regard to FIGS. 6A and 6B.

FIG. 7 is a diagram illustrating an example of read operations for mixed data. As shown in FIG. 7, a memory device 120 may include NAND memory 705. For example, the NAND memory 705 may be included in the memory 140 and/or the non-volatile memory array(s) 210.

As shown by reference number 710, the memory device 120 may program a mixed TU to the NAND memory 705. As described elsewhere herein, a mixed TU may be a TU that is associated with logical blocks having different memory statuses. The memory device 120 may be configured to program the TU to the NAND memory 705 with status information. The status information may indicate memory statuses associated with each logical block included in the TU. In some implementations, the memory device 120 may be configured to program the TU to the NAND memory 705 with a flag or other indicator that indicates that memory statuses of the set of logical blocks associated with the TU are to be checked by the memory device 120 (e.g., by firmware of the memory device 120) prior to data associated with the set of logical blocks being provided to the host device 110 (e.g., as part of a read operation). The memory device 120 may program the TU with the indicator (e.g., the flag) based on the TU being a mixed TU.

As shown by reference number 715, the memory device 120 may be configured to read the TU based on a read command received from the host device 110. For example, the host device 110 may request access to data associated with one or more logical blocks included in the TU. Therefore, the memory device 120 may be configured to read the TU from the NAND memory 705. In some implementations, the memory device 120 may store the TU in a buffer or another temporary storage location after reading the TU from the NAND memory 705.

As shown in FIG. 7, the TU may be read to, or provided to, the firmware component 420 of the memory device 120. For example, based on the TU being stored in the NAND memory 705 with the flag or indicator, the memory device 120 may be configured to provide the TU to the firmware component 420 for processing. In other words, because the TU may include logical blocks having different memory statuses, the firmware component 420 may need to analyze the logical blocks and determine status indicators to be encoded to the logical blocks (e.g., in a similar manner as described in connection with FIGS. 6A and 6B). For example, as shown by reference number 720, the firmware component 420 may determine status indicators for LBAs included in the TU that are associated with the read command. For example, the firmware component 420 may determine the memory status(es) of one or more LBAs indicated by the read command (e.g., based on the status information or other metadata stored with the TU in the NAND memory 705).

As shown by reference number 725, the firmware component 420 may be configured to encode the LBAs (e.g., that are associated with the read command) with status indicators (e.g., that indicate a memory status of the LBAs). For example, the firmware component 420 may be configured to program one or more bits (e.g., the status indicator) with values that are mapped to a memory status. The firmware component 420 may be configured to encode the one or more bits with a logical block to indicate a memory status associated with the logical block. The firmware component 420 may be configured to encode each logical block indicated by the read command with a status indicator in a similar manner. In some implementations, the firmware component 420 may be configured to encode a memory slot in the buffer (e.g., the buffer in which the TU is stored) with a status indicator (e.g., that is associated with a logical block mapped to the memory slot).

As shown by reference number 730, the firmware component 420 may provide, to the hardware component 410, the encoded LBAs for the read command. For example, the firmware component 420 may provide, to the hardware component 410, the TU and/or the buffer that is encoded with status indicators for logical blocks (e.g., LBAs) that are indicated by the read command (e.g., the host read command). As shown by reference number 735, the hardware component 410 may determine one or more responses to the read command based on the status indicators (e.g., in a similar manner as described in connection with FIGS. 6A and 6B). For example, the hardware component 410 may be configured to identify a status indicator that is encoded with an LBA. The hardware component 410 may be configured to determine an appropriate response for the LBA based on the status indicator. For example, a status indicator may map (e.g., in a table stored by the memory device 120) to one or more possible or appropriate responses to the read command for the memory status associated with the status indicator.

As shown by reference number 740, the hardware component 410 may be configured to provide, to the host device 110 (e.g., via the host interface 150), one or more responses. As described elsewhere herein, the one or more responses may be based on the status indicators encoded (e.g., by the firmware component 420) for LBAs indicated by the read command. For example, as shown in FIG. 7, a TU may be stored by the memory device 120. The TU may include logical blocks indicated by the read command. Each logical block may be encoded with a status indicator (e.g., shown in FIG. 7 as "00," "01," "11," and "00"). For example, a first status indicator (e.g., "00") may indicate that the LBA or logical block is associated with mapped status. A second status indicator (e.g., "01") may indicate that the LBA or logical block is associated with an unwritten status or a deallocated status. A third status indicator (e.g., "11") may indicate that the LBA or logical block is associated with a write zeroes status.

As shown in FIG. 7, the hardware component 410 may be configured to provide data (e.g., user data) that is stored in the NAND memory 705 to a host memory 745 (e.g., a memory associated with the host device 110). For example, the host memory 745 may include a TU that corresponds to the TU stored in the NAND memory 705. For LBAs or logical blocks associated with the mapped status, the hardware component 410 may be configured to cause data (e.g., user data) that is stored in the NAND memory 705 to be stored in a corresponding logical block in the host memory 745. As another example, for an LBA or logical block that is associated with an unwritten status or a deallocated status, the hardware component 410 may be configured to cause a first pattern (e.g., a first pre-configured pattern) to be stored in a corresponding logical block or LBA in the host memory 745. As another example, for an LBA or logical block that is associated with write zeroes status, the hardware component 410 may be configured to cause a second pattern (e.g., a second pre-configured pattern) to be stored in a corresponding logical block or LBA in the host memory 745. As described elsewhere herein, the firmware component 420 may cause the hardware component 410 to provide the different types of responses via providing the hardware component 410 with a single data transfer request (e.g., that indicates the LBAs encoded with different status indicators).

As indicated above, FIG. 7 is provided as an example. Other examples may differ from what is described with regard to FIG. 7.

FIG. 8 is a diagram illustrating an example process associated with read operations for mixed data. The operations or blocks depicted in FIG. 8 may be performed by the memory device 120, the controller 130, the host interface 150, the firmware component 420, and/or the hardware component 410, among other examples.

As shown by reference number 805, the memory device 120 may obtain a read command from a host device (e.g., the host device 110). The read command may indicate data that is to be read from a memory (e.g., the memory 140) of the memory device 120. For example, the read command may indicate one or more LBAs and one or more namespace identifiers associated with the data.

As shown by reference number 810, the memory device 120 and/or the controller 130 may read a TU associated with the data from the memory 140 (e.g., from NAND memory). For example, the memory device 120 and/or the controller 130 may translate LBA(s) indicated by the read command into one or more TUAs. The memory device 120 and/or the controller 130 may translate the TUA(s) into one or more physical addresses in the memory 140. The memory device 120 and/or the controller 130 may read data from the one or more physical addresses to obtain data associated with a TU. For example, the TU may include logical blocks corresponding to LBAs indicated by the read command.

As shown by reference number 815, the memory device 120 and/or the controller 130 may determine whether a TU that is read from the memory 140 includes a flag or other indicator that indicates that memory statuses of the set of logical blocks associated with the TU are to be checked by the memory device 120 (e.g., by firmware of the memory device 120) prior to data associated with the set of logical blocks being provided to the host device 110 (e.g., as part of a read operation). For example, the flag or indicator may be stored in the memory 140 as metadata associated with the TU.

If the TU is associated with a flag or other indicator that indicates that memory statuses of the set of logical blocks associated with the TU are to be checked by the memory device 120 (e.g., Yes), then the controller 130 (e.g., and/or the firmware component 420) may determine memory statuses of LBAs indicated by the read command (as shown by reference number 820). For example, the controller 130 (e.g., and/or the firmware component 420) may be configured to determine a memory status associated with logical blocks to be read as part of the read operation. As shown by reference number 825, the controller 130 (e.g., and/or the firmware component 420) may encode the LBAs with status indicators that indicate the memory statuses. For example, one or more bits may be used to indicate a memory status of a given LBA or a given logical block. The controller 130 (e.g., and/or the firmware component 420) may encode the one or more bits with the given LBA or the given logical block (e.g., in a similar manner as described in more detail elsewhere herein).

As shown by reference number 830, the controller 130 (e.g., and/or the firmware component 420) may provide the TU (e.g., with the encoded LBAs or encoded logical blocks) to a hardware component (e.g., the hardware component 410 and/or the host interface 150). For example, the firmware component may be configured to provide a single data transfer request that indicates the encoded LBAs or encoded logical blocks. The hardware component may determine one or more responses to be provided to the host device based on the status indicators encoded with the LBAs or logical blocks. As shown by reference number 835, the hardware component (e.g., the hardware component 410 and/or the host interface 150) may be configured to provide the one or more responses to the host device in a similar manner as described elsewhere herein.

If the TU is not associated with the flag or other indicator that indicates that memory statuses of the set of logical blocks associated with the TU are to be checked by the memory device 120 (e.g., No), then the controller 130 may provide the TU directly to the hardware component (e.g., the hardware component 410 and/or the host interface 150). For example, if the TU is not associated with the flag or other indicator, then the TU may not be associated with mixed data. Therefore, the hardware component (e.g., the hardware component 410 and/or the host interface 150) may proceed with providing a response to the host device (e.g., as shown by reference number 835) without requiring the firmware component 420 to determine the memory statuses and/or encode the LBAs (e.g., thereby conserving processing resources). In other examples, the TU may always be provided to the firmware component (e.g., the process may not check if the TU is associated with the flag or other indicator and may always follow the "Yes" path depicted in FIG. 8).

As indicated above, FIG. 8 is provided as an example. Other examples may differ from what is described with regard to FIG. 8.

FIG. 9 is a flowchart of an example method 900 associated with read operations for mixed data. In some implementations, a memory device (e.g., memory device 120) may perform or may be configured to perform one or more process blocks of FIG. 9. In some implementations, another device or a group of devices separate from or including the memory device (e.g., the host device 110) may perform or may be configured to perform one or more process blocks of FIG. 9. Additionally, or alternatively, one or more components of the memory device (e.g., the controller 130, the memory 140, the memory management component 250, the read processing component 260, the memory status determination component 270, the hardware component 410, and/or the firmware component 420) may perform or may be configured to perform one or more process blocks of FIG. 9.

As shown in FIG. 9, the method 900 may include receiving, from a host device, a read command indicating data to be read from a memory of the memory device, wherein the read command indicates one or more logical block addresses associated with the data (block 910). As further shown in FIG. 9, the method 900 may include obtaining a memory unit from the memory based on the read command, wherein the memory unit is associated with a set of logical block addresses including the one or more logical block addresses (block 920). As further shown in FIG. 9, the method 900 may include determining status information associated with the one or more logical block addresses based on information indicated by the memory unit, wherein the one or more logical block addresses are associated with different status information (block 930). As further shown in FIG. 9, the method 900 may include generating a single data transfer request associated with the one or more logical block addresses, wherein the single data transfer request indicates status indicators associated with respective logical block addresses of the one or more logical block addresses (block 940). As further shown in FIG. 9, the method 900 may include providing, to the host device, one or more responses to the read command, wherein the one or more responses are based on the status indicators (block 950).

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein, such as the operations described in connection with FIGS. 6A, 6B, 7, and 8.

FIG. 10 is a flowchart of an example method 1000 associated with read operations for mixed data. In some implementations, a memory device (e.g., memory device 120) may perform or may be configured to perform one or more process blocks of FIG. 10. In some implementations, another device or a group of devices separate from or including the memory device (e.g., the host device 110) may perform or may be configured to perform one or more process blocks of FIG. 10. Additionally, or alternatively, one or more components of the memory device (e.g., the controller 130, the memory 140, the memory management component 250, the read processing component 260, the memory status determination component 270, the hardware component 410, and/or the firmware component 420) may perform or may be configured to perform one or more process blocks of FIG. 10.

As shown in FIG. 10, the method 1000 may include obtaining, from a host device, a read command for reading data associated with one or more logical blocks (block 1010). As further shown in FIG. 10, the method 1000 may include reading, from the memory, the data corresponding to the one or more logical blocks (block 1020). As further shown in FIG. 10, the method 1000 may include encoding the data corresponding to the one or more logical blocks with one or more respective status indicators, wherein the one or more respective status indicators indicate memory statuses associated with the one or more logical blocks (block 1030). As further shown in FIG. 10, the method 1000 may include providing, to a hardware component of the memory device, a data transfer request indicating the one or more logical blocks encoded with the one or more respective status indicators (block 1040). As further shown in FIG. 10, the method 1000 may include providing, to the host device, one or more responses to the read command based on the data transfer request (block 1050).

Although FIG. 10 shows example blocks of a method 1000, in some implementations, the method 1000 may include additional blocks, fewer blocks, different blocks, or differently arranged blocks than those depicted in FIG. 10. Additionally, or alternatively, two or more of the blocks of the method 1000 may be performed in parallel. The method 1000 is an example of one method that may be performed by one or more devices described herein. These one or more devices may perform or may be configured to perform one or more other methods based on operations described herein, such as the operations described in connection with FIGS. 6A, 6B, 7, and 8.

FIG. 11 is a flowchart of an example method 1100 associated with read operations for mixed data. In some implementations, a memory device (e.g., memory device 120) may perform or may be configured to perform one or more process blocks of FIG. 11. In some implementations, another device or a group of devices separate from or including the memory device (e.g., the host device 110) may perform or may be configured to perform one or more process blocks of FIG. 11. Additionally, or alternatively, one or more components of the memory device (e.g., the controller 130, the memory 140, the memory management component 250, the read processing component 260, the memory status determination component 270, the hardware component 410, and/or the firmware component 420) may perform or may be configured to perform one or more process blocks of FIG. 11.

As shown in FIG. 11, the method 1100 may include obtaining information associated with a logical unit from a memory location, wherein the logical unit includes a set of logical blocks, and wherein a host read command is associated with one or more logical blocks from the set of logical blocks (block 1110). As further shown in FIG. 11, the method 1100 may include determining status information associated with respective logical blocks, from the one or more logical blocks, based on the information (block 1120). As further shown in FIG. 11, the method 1100 may include programming, by the memory device, status indicators to be associated with the respective logical blocks, from the one or more logical blocks, based on the status information (block 1130). As further shown in FIG. 11, the method 1100 may include generating a single data transfer request, associated with the host read command, that indicates the status indicators associated with the respective logical blocks (block 1140).

Although FIG. 11 shows example blocks of a method 1100, in some implementations, the method 1100 may include additional blocks, fewer blocks, different blocks, or differently arranged blocks than those depicted in FIG. 11. Additionally, or alternatively, two or more of the blocks of the method 1100 may be performed in parallel. The method 1100 is an example of one method that may be performed by one or more devices described herein. These one or more devices may perform or may be configured to perform one or more other methods based on operations described herein, such as the operations described in connection with FIGS. 6A, 6B, 7, and 8.

In some implementations, a memory device includes a memory; and one or more components configured to: obtain, from a host device, a read command for reading data associated with one or more logical blocks; read, from the memory, the data corresponding to the one or more logical blocks; encode the data corresponding to the one or more logical blocks with one or more respective status indicators, wherein the one or more respective status indicators indicate memory statuses associated with the one or more logical blocks; provide, to a hardware component of the one or more components, a data transfer request indicating the one or more logical blocks encoded with the one or more respective status indicators; and provide, by the hardware component and to the host device, one or more responses to the read command based on the data transfer request.

In some implementations, a method includes receiving, by a memory device and from a host device, a read command indicating data to be read from a memory of the memory device, wherein the read command indicates one or more logical block addresses associated with the data; obtaining, by the memory device, a memory unit from the memory based on the read command, wherein the memory unit is associated with a set of logical block addresses including the one or more logical block addresses; determining status information associated with the one or more logical block addresses based on information indicated by the memory unit, wherein the one or more logical block addresses are associated with different status information; generating, by the memory device, a single data transfer request associated with the one or more logical block addresses, wherein the single data transfer request indicates status indicators associated with respective logical block addresses of the one or more logical block addresses; and providing, by the memory device and to the host device, one or more responses to the read command, wherein the one or more responses are based on the status indicators.

In some implementations, a system includes means for obtaining information associated with a logical unit from a memory location, wherein the logical unit includes a set of logical blocks, and wherein a host read command is associated with one or more logical blocks from the set of logical blocks; means for determining status information associated with respective logical blocks, from the one or more logical blocks, based on the information; means for programming status indicators to be associated with the respective logical blocks, from the one or more logical blocks, based on the status information; and means for generating a single data transfer request, associated with the host read command, that indicates the status indicators associated with the respective logical blocks.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
    a memory; and
    one or more components configured to:
        obtain, from a host device, a read command for reading data associated with a plurality of logical blocks;
        read, from the memory, the data corresponding to the plurality of logical blocks;
        encode the data corresponding to the plurality of logical blocks with a plurality of respective status indicators, wherein the plurality of respective status indicators indicate memory statuses of the data stored in the plurality of logical blocks or of a plurality of physical addresses that are associated with the plurality of logical blocks;
        provide, by a controller of the memory device to a hardware component of the one or more components of the memory device, a single data transfer request indicating the plurality of logical blocks encoded with the plurality of respective status indicators; and
        provide, by the hardware component and to the host device, a plurality of responses to the read command based on the single data transfer request.

2. The memory device of claim 1, wherein the plurality of responses are based on the plurality of respective status indicators.

3. The memory device of claim 1, wherein the one or more components, to read the data, are configured to:
    read a translation unit that includes a set of logical blocks including the plurality of logical blocks.

4. The memory device of claim 1, wherein the memory statuses associated with the plurality of logical blocks includes at least one of:
    a mapped status of the data stored in the plurality of logical blocks,
    an unwritten status of the one or more physical addresses that are associated with the plurality of logical blocks,
    a deallocated status of the data stored in the plurality of logical blocks,
    an error status of the data stored in the plurality of logical blocks, or
    a write-zeroes status of the data stored in the plurality of logical blocks.

5. The memory device of claim 1, wherein the plurality of respective status indicators indicate a first memory status associated with a first logical block, of the plurality of logical blocks, and a second memory status associated with a second logical block, of the plurality of logical blocks,
    wherein the first memory status and the second memory status are both indicated in the single data transfer request, and
    wherein the hardware component, to provide the plurality of responses to the read command, is configured to:
        provide, to the host device, a first response, of the plurality of responses, associated with the first logical block and based on the first memory status; and
        provide, to the host device, a second response, of the plurality of responses, associated with the second logical block and based on the second memory status.

6. The memory device of claim 1, wherein the data corresponding to the plurality of logical blocks includes user data and metadata, and
    wherein the one or more components are further configured to:

determine the plurality of respective status indicators based on the metadata associated with respective logical blocks from the plurality of logical blocks.

7. The memory device of claim 1, wherein the hardware component, to provide the plurality of responses to the read command, is configured to:
identify a status indicator, from the plurality of respective status indicators, associated with a logical block, from the plurality of logical blocks; and
provide, to the host device, user data associated with the logical block or a response pattern based on the status indicator.

8. The memory device of claim 1, wherein a status indicator, from the plurality of respective status indicators, indicates data and protection information to be provided to the host device for a logical block, from the plurality of logical blocks, that is associated with the status indicator.

9. A memory device, comprising:
a memory; and
one or more components configured to:
obtain, from a host device, a read command for reading data associated with one or more logical blocks;
read, from the memory, a translation unit that includes a set of logical blocks including the one or more logical blocks, wherein the translation unit includes an indication that memory statuses of the set of logical blocks are to be checked by the memory device prior to data associated with the set of logical blocks being provided to the host device;
encode the data corresponding to the one or more logical blocks with one or more respective status indicators,
wherein the one or more respective status indicators indicate the memory statuses associated with the one or more logical blocks;
provide, to a hardware component of the one or more components, a data transfer request indicating the one or more logical blocks encoded with the one or more respective status indicators; and
provide, by the hardware component and to the host device, one or more responses to the read command based on the data transfer request.

10. A method, comprising:
receiving, by a memory device and from a host device, a read command indicating data to be read from a memory of the memory device,
wherein the read command indicates a plurality of logical block addresses associated with the data;
obtaining, by the memory device, a memory unit from the memory based on the read command,
wherein the memory unit is associated with a set of logical block addresses including the plurality of logical block addresses;
determining status information associated with the plurality of logical block addresses based on information indicated by the memory unit,
wherein the status information indicates memory statuses of data stored in the plurality of logical block addresses or of a plurality of physical addresses associated with the plurality of logical block addresses, and
wherein the plurality of logical block addresses are associated with different status information;
providing, by one or more firmware components of the memory device and to one or more hardware components of the memory device, a single data transfer request associated with the plurality of logical block addresses,
wherein the single data transfer request indicates status indicators associated with respective logical block addresses of the plurality of logical block addresses; and
providing, by the memory device and to the host device, a plurality of responses to the read command,
wherein the plurality of responses are based on the status indicators.

11. The method of claim 10, the method further comprising:
generating, by the one or more firmware components, the single data transfer request to cause the one or more hardware components to provide the plurality of responses.

12. The method of claim 10, wherein the memory unit is a translation unit.

13. The method of claim 10, wherein status information associated with a logical block address, from the plurality of logical block addresses, indicates a mapped status, and
wherein a response, from the plurality of responses, includes user data associated with the logical block address.

14. The method of claim 10, wherein status information associated with a logical block address, from the plurality of logical block addresses, indicates a deallocate status or an unwritten status, and
wherein a response, from the plurality of responses, includes a pre-configured pattern of data.

15. The method of claim 10, wherein the plurality of responses include a first type of response and a second type of response, and
wherein the single data transfer request causes the first type of response and the second type of response to be provided to the host device in response to the read command.

16. The method of claim 10, wherein the single data transfer request indicates a status indicator for each logical block address indicated by the read command.

17. The method of claim 10, further comprising:
storing the memory unit in a buffer based on obtaining the memory unit from the memory; and
encoding memory slots of the buffer with the status indicators.

18. The method of claim 17, further comprising:
erasing the buffer based on providing the plurality of responses.

19. A method, comprising:
receiving, by a memory device and from a host device, a read command indicating data to be read from a memory of the memory device,
wherein the read command indicates one or more logical block addresses associated with the data;
obtaining, by the memory device, a memory unit from the memory based on the read command,
wherein the memory unit is associated with a set of logical block addresses including the one or more logical block addresses, and
wherein two or more logical block addresses, from the one or more logical block addresses, are sequential in an order of the one or more logical block addresses and are associated with a same status information;
determining status information associated with the one or more logical block addresses based on information indicated by the memory unit, wherein the one or more logical block addresses are associated with different status information;

generating, by the memory device, a single data transfer request associated with the one or more logical block addresses,
 wherein the single data transfer request indicates status indicators associated with respective logical block addresses of the one or more logical block addresses, and
 wherein the single data transfer request indicates a single status indicator for the two or more logical block addresses; and providing, by the memory device and to the host device, one or more responses to the read command,
 wherein the one or more responses are based on the status indicators.

20. A system, comprising:

means for obtaining information associated with a logical unit from a memory location,
 wherein the logical unit includes a set of logical blocks, and
 wherein a host read command is associated with a plurality of logical blocks from the set of logical blocks;

means for determining status information associated with respective logical blocks, from the plurality of logical blocks, based on the information,
 wherein the status information indicates a status of data stored in the respective logical blocks or of a plurality of physical addresses associated with the respective logical blocks;

means for programming a plurality of status indicators to be associated with the respective logical blocks, from the plurality of logical blocks, based on the status;

means for providing, from a controller of the system to a hardware component of the system, a single data transfer request, associated with the host read command, that indicates the plurality of status indicators associated with the respective logical blocks; and means for providing, from the hardware component of the system to a host device and responsive to the host read command and the single data transfer request, a plurality of responses that are based on the plurality of status indicators.

21. The system of claim 20, wherein the plurality of responses include at least one of:
 user data,
 a fixed pattern,
 an error response, or
 a deallocation response.

22. The system of claim 20, wherein a status indicator, from the plurality of status indicators, is mapped to one or more possible responses to be provided to a host device in response to the host read command.

23. The system of claim 20, further comprising:
 means for identifying, from the information associated with the logical unit, an indicator that the status information is to be determined by the system.

24. The system of claim 20, wherein the means for programming the plurality of status indicators to be associated with the respective logical blocks comprises:
 means for encoding one or more bits to information associated with the respective logical blocks,
 wherein the one or more bits indicate a status indicator from the plurality of status indicators.

25. The system of claim 20, further comprising:
 means for reading a translation unit that includes a second set of logical blocks including the plurality of logical blocks, wherein the translation unit includes an indication that memory statuses of the second set of logical blocks are to be checked by the system prior to data associated with the second set of logical blocks being provided to the host device.

* * * * *